UNITED STATES PATENT OFFICE.

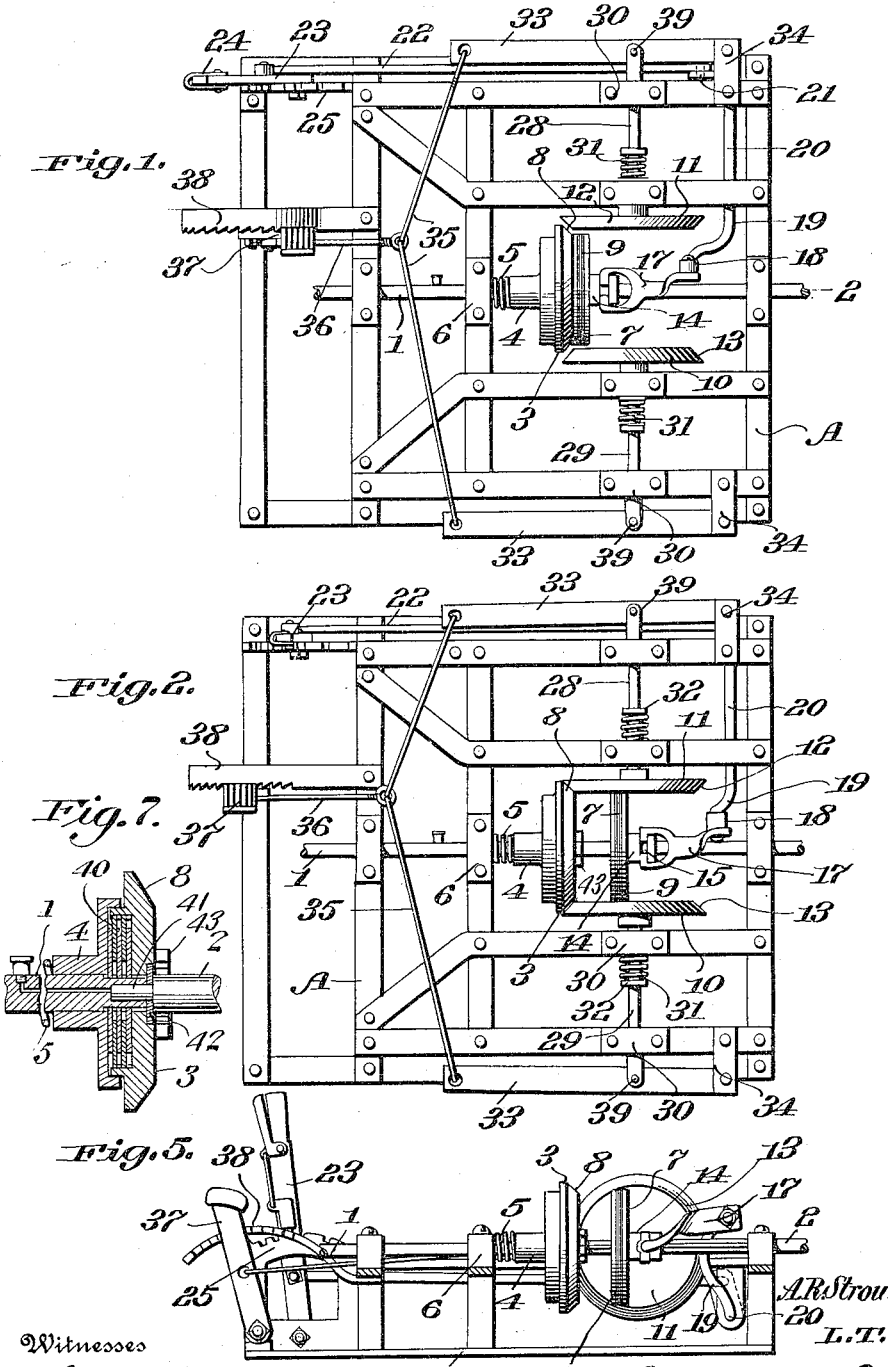

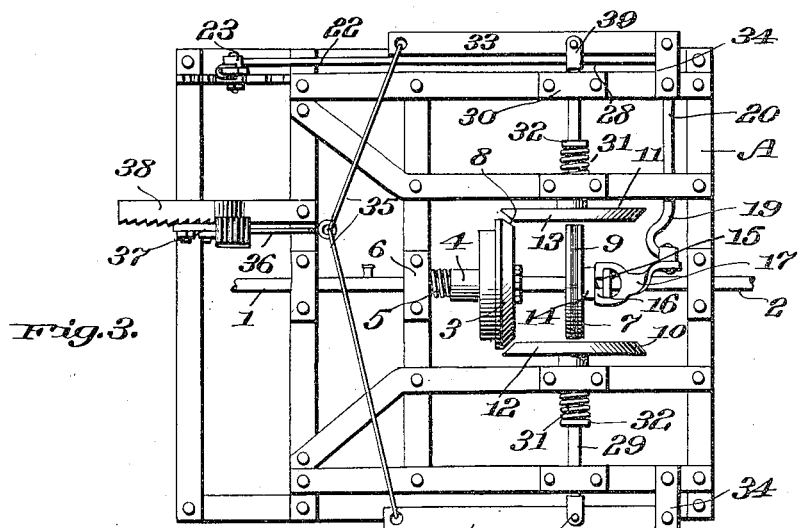
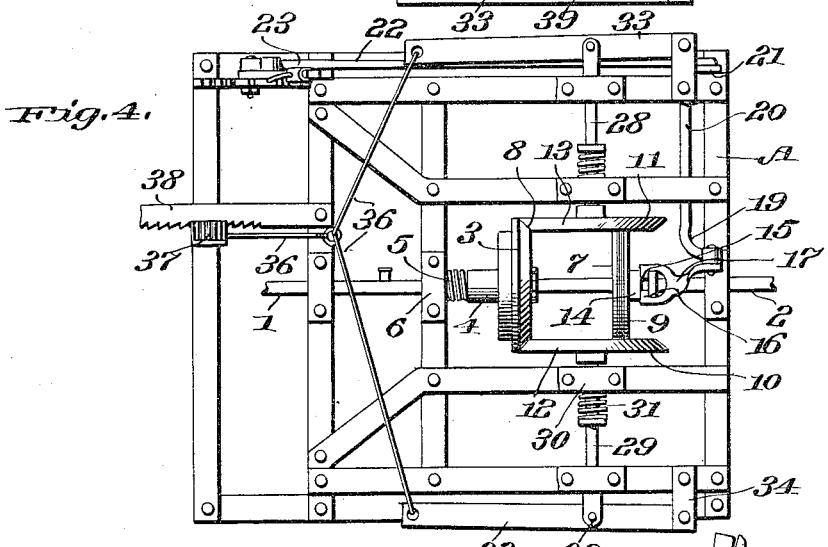

ARTHUR R. STROUVELLE AND LEWIS T. MASON, OF CLOVIS, NEW MEXICO.

TRANSMISSION-GEARING FOR AUTOMOBILES.

1,154,140.

Specification of Letters Patent. Patented Sept. 21, 1915.

Application filed August 27, 1913. Serial No. 786,925.

*To all whom it may concern:*

Be it known that we, ARTHUR R. STROUVELLE and LEWIS T. MASON, citizens of the United States, residing at Clovis, in the county of Curry and State of New Mexico, have invented new and useful Improvements in Transmission-Gearing for Automobiles, of which the following is a specification.

This invention relates to transmission gearing for automobiles, motor cars and other motor propelled vehicles, the object of the invention being to provide a thoroughly effective and reliable transmission mechanism whereby the motion and power of the driving section of the shaft may be transmitted to the driven section of the shaft at any desired change of relative speeds between the two sections of the shaft and the driven section reversed as to its direction of rotation with relation to the driving section of the shaft, the result being obtained without the usual toothed gears now in common use, friction gears being substituted therefor and being combined and arranged to operate in a novel relation whereby certain gears may be shifted with relation to others for producing the desired rate of speeds and direction of rotation, manually controlled means being employed for shifting certain of the gears in relation to the remainder to enable the operator to obtain either a direct drive, and intermediate or lower speed drive, or a neutral position in which no movement will be imparted to the driven shaft.

With the above an other objects in view, the invention consists in the construction, combination and arrangement of parts, as will hereinafter be more fully described, illustrated and claimed.

In the accompanying drawings: Figure 1 is a plan view of the transmission mechanism showing the parts arranged for direct drive. Fig. 2 is a similar view showing the parts arranged for intermediate or lower speed forward. Fig. 3 is a similar view showing the position of the parts at the neutral point. Fig. 4 is a plan view showing the parts in position for reverse drive. Fig. 5 is a vertical longitudinal section taken adjacent to the driving and driven shaft sections showing the clutch and the lever for shifting the transmission wheels. Fig. 6 is a side elevation thereof showing the hand lever and connections for shifting the driven wheel. Fig. 7 is a detail diametrical section through the master wheel and its hub showing the multiple disk clutch and the tenoned engagement between the driving and driven shafts.

Referring to the drawings A designates generally the supporting frame of the transmission gearing, the said frame varying in size and construction in accordance with the automobile or other vehicle in connection with which the transmission gearing is employed.

1 designates the driving shaft of an automobile and 2 the driven shaft, the said shafts 1 and 2 being journaled in suitable bearings on the frame A and motion being imparted to the shaft 1 from the usual motor while the shaft 2 is connected through the usual differential (not shown) to the rear driving wheels of the machine (not shown).

In carrying out the invention, a driving wheel 3 is clutched to the shaft 1 so as to rotate therewith and is capable of a limiting sliding movement lengthwise of the shaft 1, the wheel 4 being pressed toward the wheel 3 by a thrust spring 5 shown of the coiled expansion type, said spring being interposed between the wheel 4 and a fixed part of the frame such as the bearing 6 for the shaft 1.

Arranged opposite the wheel 3 and adapted to coact therewith under certain conditions is a driven wheel 7 which is keyed to the shaft 2 and adapted to slide longitudinally thereon, the wheel 7 rotating constantly with the shaft 2 while the wheel 3 rotates constantly with the shaft 1.

The wheel 3 is provided with a beveled friction surface 8 while the wheel 7 is provided with a cylindrical friction face 9. Arranged at opposite sides of the wheels 3 and 7 are what I term transmission wheels 10 and 11 each of which is provided with a beveled friction face as indicated at 12 and 13, said beveled faces being adapted to frictionally engage and be driven by the beveled face 8 of the wheel 3 while the flat inner faces of the wheels 12 and 13 are adapted to engage the cylindrical friction face 9 of the wheel 7 for the purpose of driving the last named wheel.

The wheel 7 is provided with a hub 14 having a groove 15 therein in which is a split ring or collar 16 having secured thereto a shifting link or fork 17 the opposite end of which is pivotally connected at 18 to the curved arm 19 of a rock shaft 20 journaled in bearings on the frame A and provided at its outer end with an arm 21 from which a connecting rod 22 extends to a main shift lever 23 provided with a thumb latch 24 engaging a notched rack 25 bearing a fixed relation to the frame A or to some other fixed part of the frame or chassis of the automobile. The rack 25 is shown as provided with three notches 26, 27 and 28 adapted to be engaged by the latch 24 to hold the transmission gearing in high or intermediate speed or neutral position.

The wheels 10 and 11 are mounted on transverse shafts 28 and 29 which are slidable longitudinally through bearings 30 on the frame A, the wheels 10 and 11 being normally held out of engagement with the wheels 3 and 7 by coiled expansion springs 31 interposed between collars 32 on the shafts 28 and 29 and fixed shoulders such as are furnished by the inner bearings 30 in which said shafts are journaled.

33 designates a pair of presser levers which are fulcrumed at 34 on the frame A while the free ends of said presser levers are connected to the two branches 35 of a cable or its equivalent, the main line 36 of the cable extending to a manually operated lever 37 shown in the form of a foot lever arranged in front of the driver in his seat on the machine, said lever being adapted to engage a rack 38 which serves to hold the lever in any position to which it is thrust. By the arrangement just described, it will be seen that by pressing against the lever 37 and drawing on the cable 36, the presser levers 33 will be moved inwardly and by having a jointed connection at 39 with the shafts 28 and 29, the wheels 10 and 11 will be forced toward each other until they bear against the wheels 3 and 7 above described. Under this adjustment of the parts, the wheel 3 drives the wheels 10 and 11 and the last named wheels in turn drive the wheel 7.

When the wheel 7 is thrust to the forward limit of its movement, it frictionally engages and is driven by the wheel 3 so that the shaft 2 is driven at the same speed as the shaft 1. Under this arrangement the wheels 3 and 7 form complemental parts of a clutch and give a direct drive between the two shafts 1 and 2.

In the preferred embodiment of this invention, a multiple disk clutch indicated at 40 is interposed between the adjacent faces of the wheels 3 and 4 so that one wheel will take up the other without gripping too suddenly and imparting a jerky movement to the transmission.

The parts are illustrated in Fig. 1 as arranged for a direct drive or what is known as high speed gear, in which case the wheels 10 and 11 are inactive. By shifting the wheel 9 away from the wheel 3 and by shifting the wheels 10 and 11 inwardly, the driven shaft is driven by the wheel 3, the wheels 10 and 11 and the wheel 7. The wheel 7 will be driven at a speed in accordance with the position occupied thereby relatively to the centers of the wheels 10 and 11, it being understood that the wheels 10 and 11 have been moved inwardly so as to frictionally engage both of the wheels 3 and 7. When the wheel 7 reaches a point close to the wheel 3, the shaft 2 is driven at nearly the speed of the shaft 1 whereupon the operator releases the lever 37 and operates the lever 23, thereby throwing the wheels 10 and 11 out of operation and throwing the wheel 7 into direct clutching contact with the wheel 3 whereupon a direct drive is obtained. By shifting the wheel 7 to the opposite side of the centers of the wheels 10 and 11, the shaft 2 will be driven in a reverse direction to that of the shaft 1 thereby enabling the machine to be backed and the speed of the shaft 2 will be increased or diminished relatively to the speed of the shaft 1 in accordance with the distance of the point of contact of the wheel 7 and the wheels 10 and 11 between the center and periphery of the last named wheels. The thrust spring 5 serves to maintain the necessary frictional engagement between the wheels 3 and 7 and also between the wheel 3 and the transmission wheels 10 and 11. When the wheel 7 is thrust hard against the wheel 3, the spring 5 is compressed to a certain extent, sufficiently to avoid any contact between the beveled face 8 of the wheel 3 and the corresponding beveled faces 12 and 13 of the wheels 10 and 11.

If desired the wheels 3 and 7 may be composed of fiber or other material having good frictional qualities in which case the multiple disk clutch may either be used or dispensed with as may be found expedient. It will be noted that under direct drive, the frictional peripheral surfaces of all of the wheels will not be in use thus greatly increasing the life and durability of the transmission mechanism as a whole and proportionately reducing the wear and tear thereon, the said friction surfaces being only used in starting the machine and in reversing the same.

By reference to Fig. 7 it will be observed that one of the shafts, for example the driven shaft 2, is provided with a tenon 41 projecting from the end thereof and fitting into a corresponding recess in the end of the other shaft 1, to keep the two shafts in alinement.

42 designates a washer or packing disk interposed between the abutting ends of the shafts 1 and 2 to take up end thrust.

43 designates a clutch face on the wheel 3 which is adapted to be engaged by a corresponding clutch face on the adjacent side of the wheel 7 where the mechanism is in high gear.

What we claim is:

In transmission gearing, a driving shaft, a driven shaft in line therewith, a driving wheel clutched to the driving shaft, a driven wheel keyed to and slidable along the driven shaft, means for shifting said driven wheel longitudinally of its shaft, oppositely arranged transmission wheels shiftable in a direction at right angles to said shafts and adapted to simultaneously engage both the driving and the driven wheels, expansion springs encircling the shafts of said transmission wheels and acting to press said wheels away from the driving and driven wheels, and manually controlled means for simultaneously shifting both transmission wheels toward and away from each other comprising levers connected with the shafts of said transmission wheels, a manually controlled lever, and links connecting the last named lever and the first named levers.

In testimony whereof we affix our signatures in presence of two witnesses.

ARTHUR R. STROUVELLE.
LEWIS T. MASON.

Witnesses:
R. E. ROWELLS,
E. H. ROBINSON.

Copies of this patent may be obtained for five cents each, by addressing the "Commissioner of Patents, Washington, D. C."